United States Patent
Paulsen et al.

(10) Patent No.: US 9,086,765 B2
(45) Date of Patent: Jul. 21, 2015

(54) INTERDIGITATED RANDOMIZED ELECTRODE PATTERN TO INCREASE THE AREA OF A TOUCHPAD HAVING A LIMITED NUMBER OF CONTROLLER IC DRIVE PINS

(75) Inventors: Keith Paulsen, Centerville, UT (US); Jared G. Bytheway, Sandy, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 667 days.

(21) Appl. No.: 12/815,195

(22) Filed: Jun. 14, 2010

(65) Prior Publication Data
US 2011/0001713 A1    Jan. 6, 2011

Related U.S. Application Data

(60) Provisional application No. 61/186,776, filed on Jun. 12, 2009.

(51) Int. Cl.
*G06F 3/044* (2006.01)
(52) U.S. Cl.
CPC ................................ *G06F 3/044* (2013.01)
(58) Field of Classification Search
CPC ..................................................... G06F 3/044
USPC ............................... 345/173, 174; 178/18.06
See application file for complete search history.

(56) References Cited

U.S. PATENT DOCUMENTS

2006/0262101 A1* 11/2006 Layton et al. ................. 345/173
2007/0132737 A1*  6/2007 Mulligan et al. ............. 345/173
2008/0079699 A1*  4/2008 Mackey ........................ 345/174
2009/0289918 A1* 11/2009 Muranaka .................... 345/174

* cited by examiner

*Primary Examiner* — Allison Johnson
(74) *Attorney, Agent, or Firm* — Morris O'Bryant Compagni, PC

(57) ABSTRACT

Increasing the effective size of a touchpad while using a single controller IC, wherein a pseudo random pattern is used such that when a certain order of electrical signals is applied to the electrodes, the local electrical fields cancel or are very large in a first region while the electrical fields in a second region create a desired electrical field pattern, wherein when a finger makes contact in the second region a certain electrical signal is expected, wherein when a finger makes contact in the first region the electrical signal is unexpected, and wherein the difference between the electrical signals from the first region and the second region can be distinguished and thus the region in which the finger made contact can be determined.

6 Claims, 6 Drawing Sheets

FIGURE 3

INTERDIGITATED RANDOMIZED ELECTRODE PATTERN TO INCREASE THE AREA OF A TOUCHPAD HAVING A LIMITED NUMBER OF CONTROLLER IC DRIVE PINS

CROSS REFERENCE TO RELATED APPLICATIONS

This document claims priority to and incorporates by reference all of the subject matter included in the provisional patent application Ser. No. 61/186,776.

BACKGROUND OF THE INVENTION

1. Field of the Invention

This invention relates generally to touchpads. More specifically, the present invention is a system and method for increasing the area of a touchpad when using a controller IC that has a limited number of inputs.

2. Description of Related Art

Hereinafter, references to a touchpad shall include all touch sensitive surfaces including touchpads and touch screens. There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE™ Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which, side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

The touchpad described above uses a single controller IC having a limited number of input pins for receiving signals from the X, Y and sense electrodes. The finite number of pins has meant that the largest area of a touchpad was determined by the spacing between X and Y electrodes. Thus, it would be an advantage to use a standard controller IC but increase the area of a touchpad without increasing the spacing between electrodes.

BRIEF SUMMARY OF THE INVENTION

An embodiment of the invention is increasing the effective size of a touchpad while using a single controller IC, wherein a pseudo random pattern is used such that when a certain order of electrical signals is applied to the electrodes, the local electrical fields cancel or are very large in a first region while the electrical fields in a second region create a desired electrical field pattern, wherein when a finger makes contact in the second region a certain electrical signal is expected, wherein when a finger makes contact in the first region the electrical signal is unexpected, and wherein the difference between the electrical signals from the first region and the second region can be distinguished and thus the region in which the finger made contact can be determined.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 3 is a graphical illustration of the signals that are used in a wide scanning mode to determine gross finger position.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
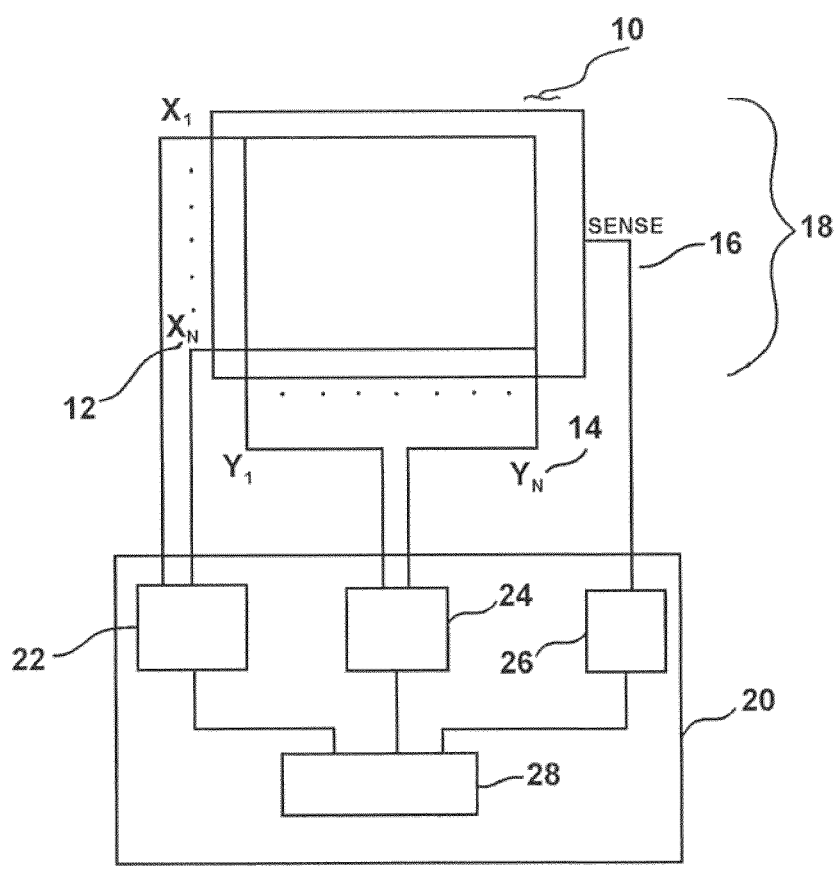
FIG. 1 is a block diagram of operation of a first embodiment of a touchpad that is found in the prior art, and which is adaptable for use in the present invention.
Figure 2:
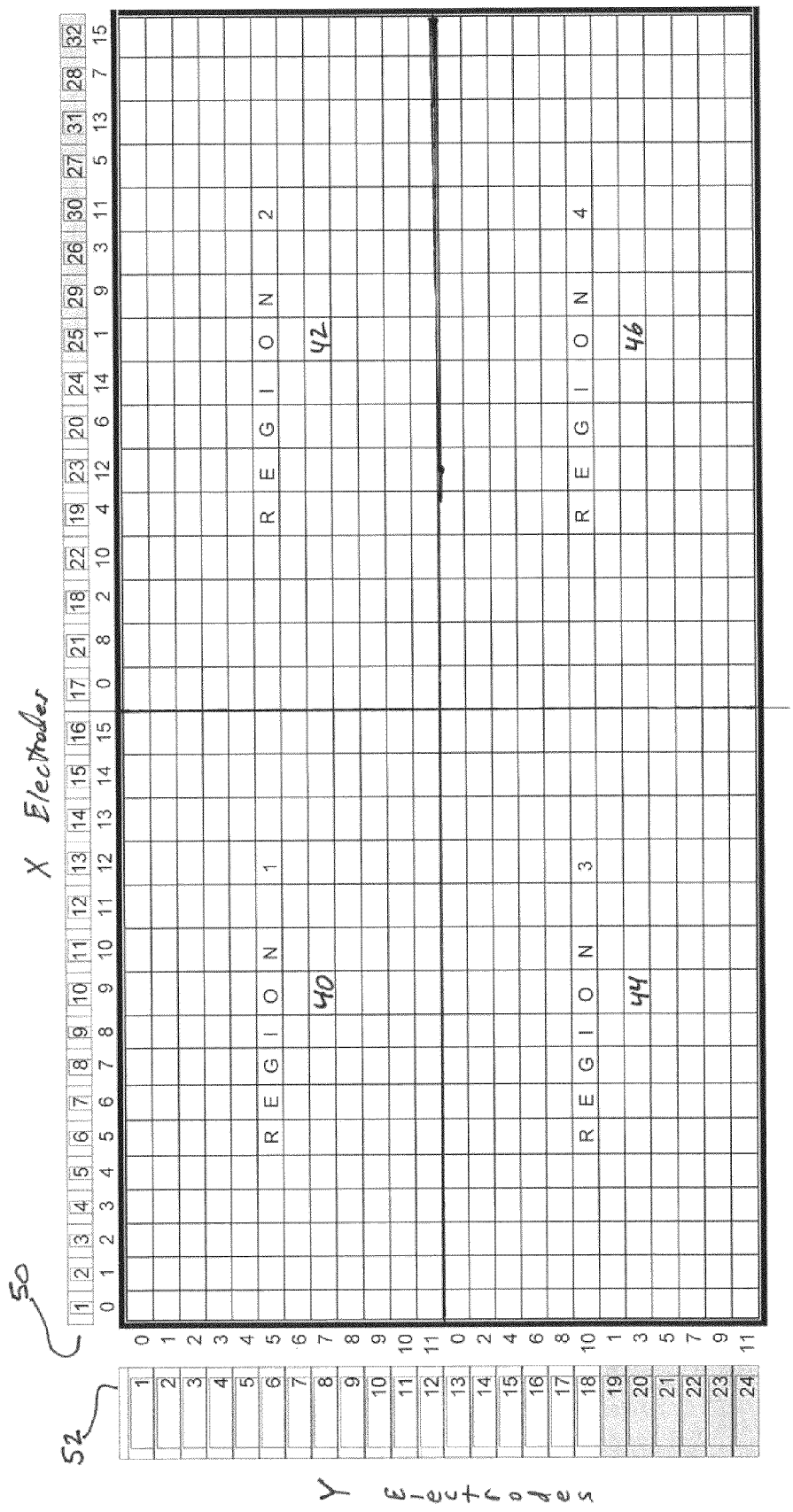
FIG. 2 is a block diagram that shows how the pins of a single controller IC can be coupled to the X and Y electrodes to create a touchpad or touchpanel that is four times larger than a typical design without having to use demultiplexing of signals.

FIG. 2 is a block diagram that shows how the pins of a single controller IC can be coupled to the X and Y electrodes to create a touchpad or touchpanel that is four times larger than a typical design without having to use demultiplexing of signals.

In this figure, four regions 40, 42, 44, 46 are shown. As explained above, there are typically sixteen X and twelve Y electrode pins on a controller IC used by Cirque® Corporation. It should be understood that this is an example only, and that a controller IC can have a greater or fewer number of electrode pin available for X and Y electrodes.

Each of the controller IC pins is coupled to two pins. For example, the first sixteen X electrode pins, shown on the top row 50 are coupled in numerical order to the first sixteen X electrodes of the large touchpad 60, which is a combination of the four regions 40, 42, 44 and 46. Likewise, the first twelve Y electrode pins, shown in column 52, are coupled in numerical order to the first twelve Y electrodes of the large touchpad 60. Thus the first region 40 would operate as a touchpad with the controller IC coupled to the X and Y electrodes in a typical manner.

However, the remaining sixteen X electrodes (numbered 17 to 32) in row 50 and the remaining twelve Y electrodes (numbered 13 to 24) in column 52 are coupled to the controller IC in a pseudo random pattern. The term "pseudo random pattern" means that the electrodes can be put in many different sequences. While the pattern may be random, it must be confirmed that the patterns acts required.

In order for the present invention to function, when drive signals are applied, the drive signals must create the desired electrical fields in one particular region, while generating a useless pattern in all the other regions.

Of course, it is known how the drive signals must be put on the X and Y electrodes in order to obtain useless or even cancelling electrical fields in three regions while obtaining an ordered and useful pattern in the remaining region. For example, if it is desirable to search for an object in region 1 (40), drive signals will be applied to the X and Y electrodes to obtain a useful pattern of drive signals. In all other regions 42, 44 and 46, the resulting electrical fields or signals will cancel each other out or be very large.

Thus, if a finger touches the touchpad in the first region 40, a certain electrical signal is expected. If a finger touches the touchpad in the other regions 42, 44 or 46, the returned electrical signal is unexpected. The difference between these signals can be distinguished and thus the region in which the finger is actually located can be determined by a process of elimination. In other words, a useful electric drive signal is provided for each of the regions 40, 42, 44 and 46 one at a time, in any desired order, until a useful signal is obtained. While a useful drive signal pattern is present in one region, the drive signals in all the remaining regions will be useless or invalid, and ignored.

In another embodiment of the present invention, the system uses wide and narrow scans. A wide scanning mode can be used to determine gross finger position. A wide electrical signal pattern is a large group of electrodes that are energized to the same polarity, either P or N. Once a gross position determination is made, then the narrow electrical signal patterns can be applied to determine a more precise location of the finger. A narrow pattern is a smaller group of electrodes that are energized to the same polarity.

Various randomization patterns of electrodes can be implemented in various embodiments of the present invention. FIGS. 3 through 6 are examples only and should not be considered as limiting.

Figure 3:
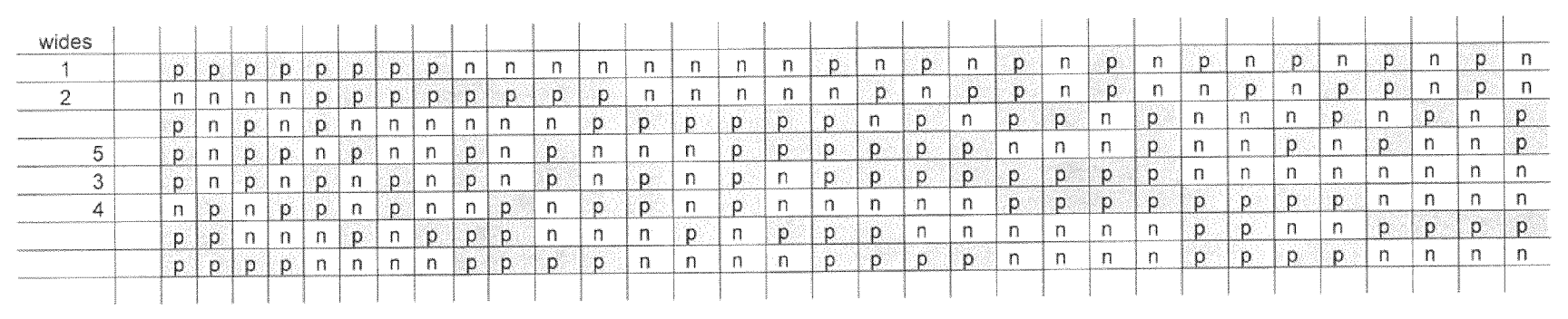

FIG. 3 is a graphical illustration of the signals that can be used in a wide scanning mode to determine gross finger position.

Figure 4:
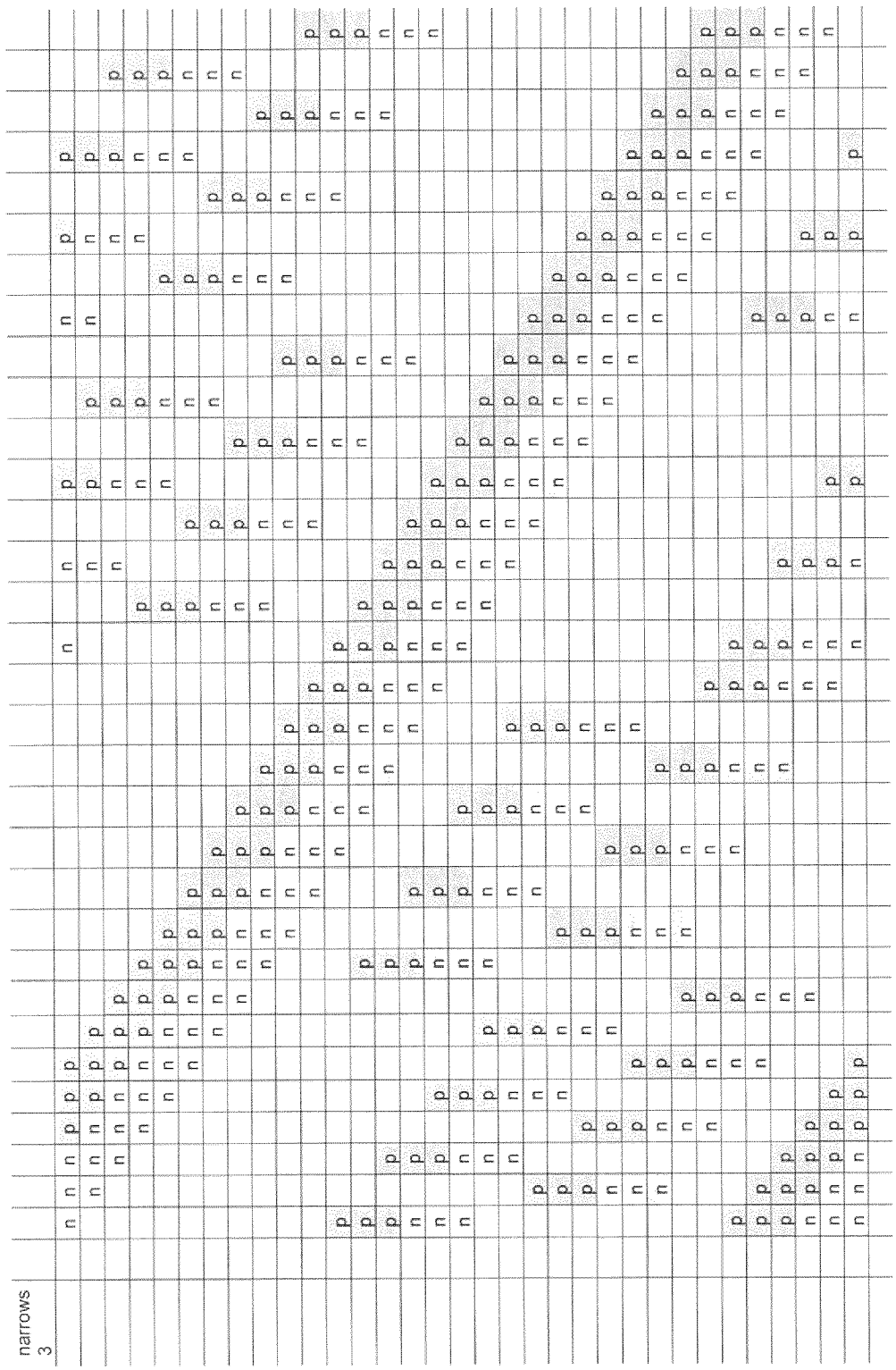
FIG. 4 is an illustration of the electrical signals that can be used to determine a specific location of a finger, wherein 3 electrodes are energized with an N signal and 3 electrodes are energized with a P signal.

FIG. 4 is an illustration of the electrical signals that can be used to determine a specific location of a finger, wherein 3 electrodes are energized with an N signal and 3 electrodes are energized with a P signal.

Figure 5:
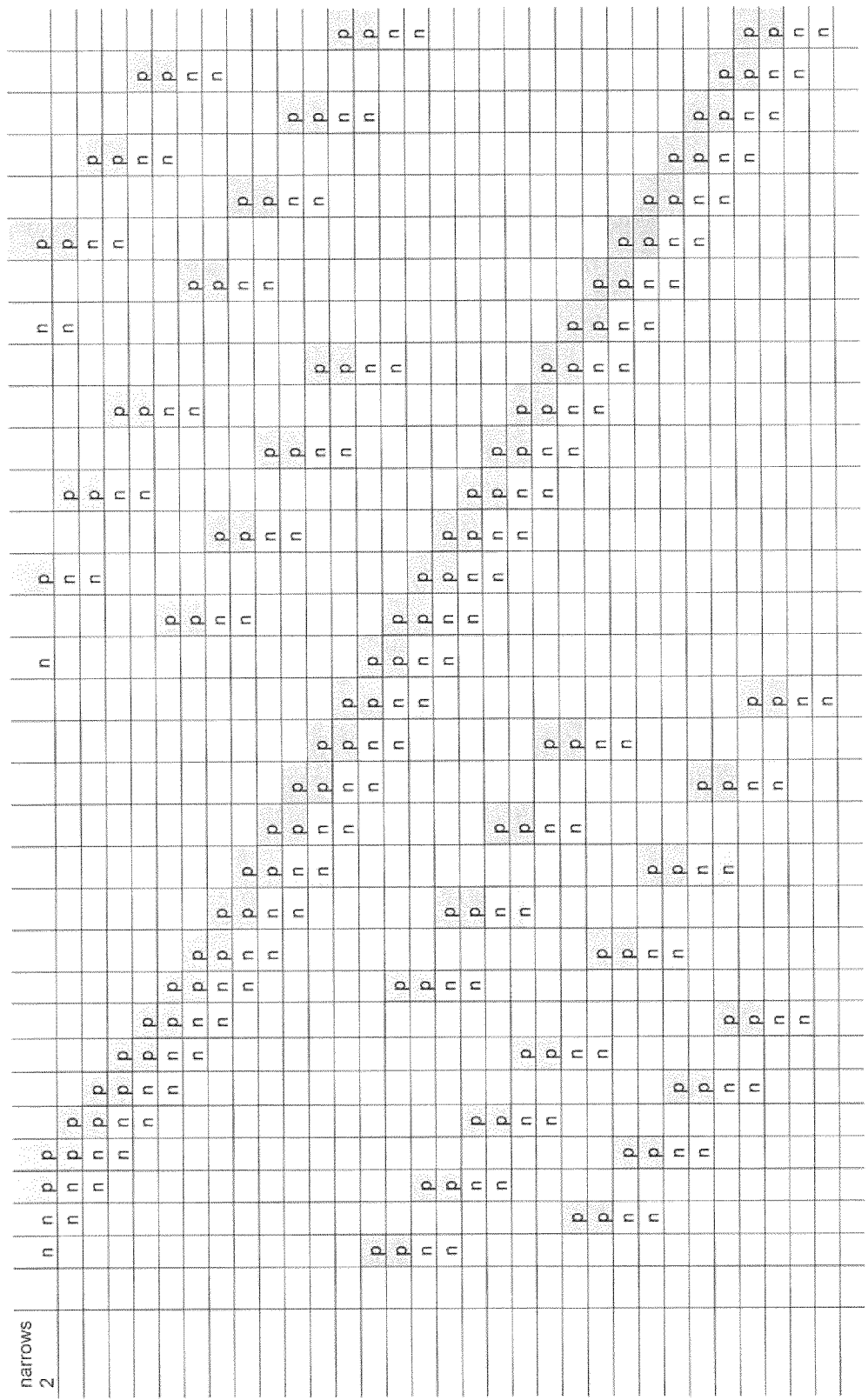
FIG. 5 is an illustration of the electrical signals that can be used to determine a specific location of a finger, wherein 2 electrodes are energized with an N signal and 2 electrodes are energized with a P signal.

FIG. 5 is an illustration of the electrical signals that can be used to determine a specific location of a finger, wherein 2 electrodes are energized with an N signal and 2 electrodes are energized with a P signal.

Figure 6:
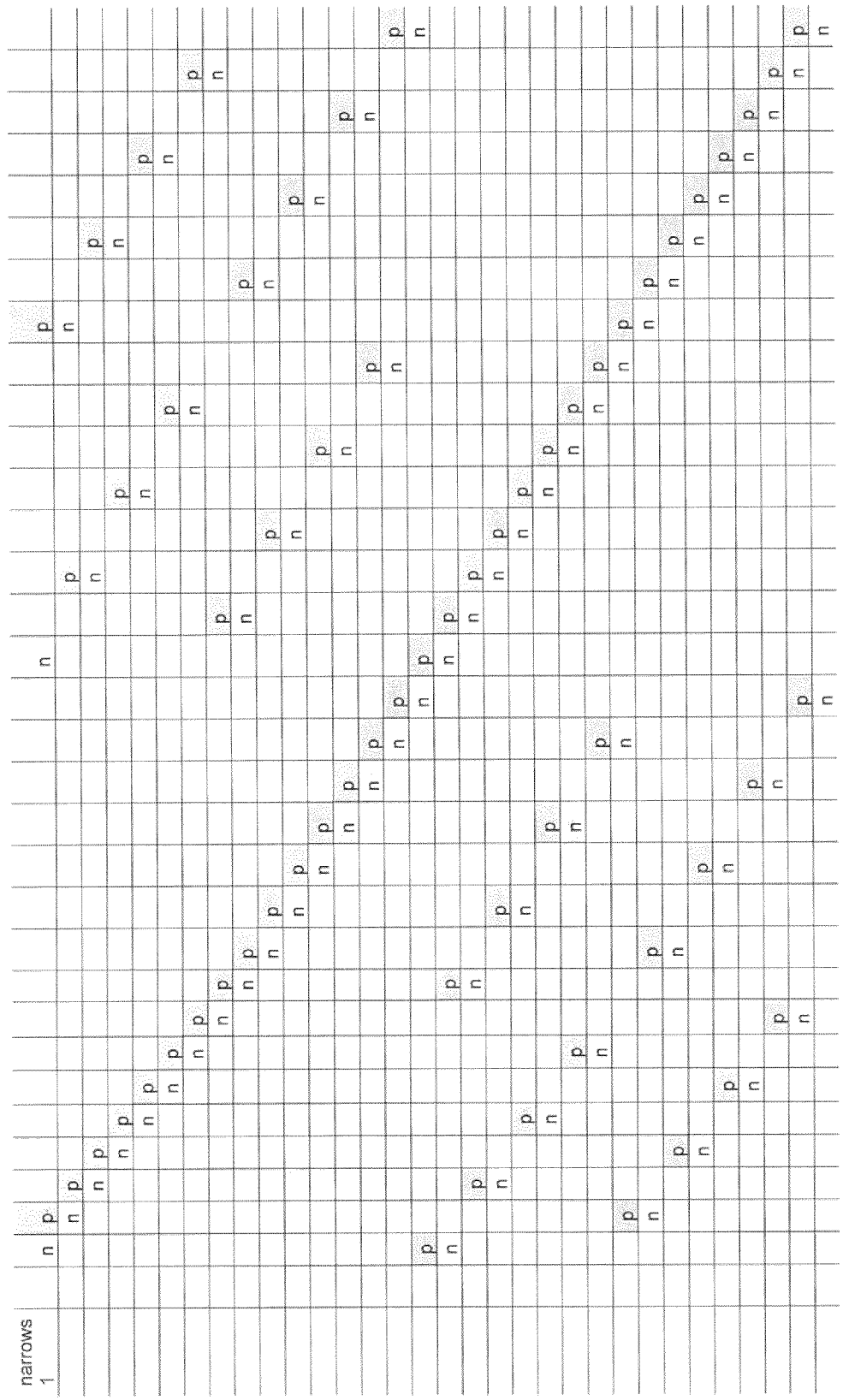
FIG. 6 is an illustration of the electrical signals that can be used to determine a specific location of a finger, wherein 1 electrode is energized with an N signal and 1 electrode is energized with a P signal.

FIG. 6 is an illustration of the electrical signals that can be used to determine a specific location of a finger, wherein 1 electrode is energized with an N signal and 1 electrode is energized with a P signal.

In an alternative embodiment of the present invention, a third instance of electrodes can be used. The resulting large touchpad would thus be 3 regions in the X direction and 3 regions in the Y direction for a total touchpad area comprised of 9 regions. The only limitation is the total number of electrodes that can be driven by each pin of the controller IC. Accordingly, the present invention can be used to implement a very large touchpad.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for increasing the effective size of a touchpad when using a single controller IC for providing drive signals that only provide a useful signal in a single region of a plurality of regions of the touchpad, said method comprised of:

1) providing a plurality of parallel X electrodes and disposed on a first side of a substrate that may function as drive or sense electrodes;

2) providing a plurality of parallel Y electrodes disposed on a second side of the substrate, wherein the Y electrodes are co-planar with and orthogonal to the X electrodes, and that may function as drive or sense electrodes, but always opposite in function to a current function of the plurality of X electrodes;

3) connecting each drive pin of the single controller IC to two electrodes of a large touchpad and providing a drive signal to the two electrodes simultaneously, wherein the drive pins are placed in an order which will result in only one region out of four regions receiving useful drive signals at a time, wherein only if a finger is in the region receiving the useful drive signals will the touchpad receive useful information; and 4) creating the desired useful electrical fields in the one region out of four regions, while creating cancelling electrical fields in the other regions.

2. The method as defined in claim 1 wherein the method further comprises applying a drive signal pattern to the plurality of electrodes that are functioning as drive electrodes.

3. The method as defined in claim 1 wherein the method further comprises coupling a plurality of electrodes functioning as sense electrodes to the single controller IC.

4. The method as defined in claim 1 wherein the method further comprises creating the desired electrical fields in the one region out of four regions, while generating a useless pattern in the other regions.

5. The method as defined in claim 4 wherein the method further comprises creating cancelling electrical fields in the other regions.

6. A method for increasing the effective size of a touch sensor when using a single controller IC for providing drive signals that only provide a useful signal in a single region of a plurality of regions of the touch sensor, said method comprised of:

1) providing a plurality of parallel first electrodes disposed on a first side of a substrate that may function as drive or sense electrodes;

2) providing a plurality of parallel second electrodes disposed on a second side of the substrate, wherein the second electrodes are co-planar with and orthogonal to the first electrodes, wherein the second electrodes may function as drive or sense electrodes, but always opposite in function to a current function of the first electrodes;

3) connecting each drive pin of the single controller IC to at least two electrodes of a large touch sensor and providing a drive signal to the two electrodes simultaneously, wherein the drive pins are placed in an order which will result in only one region out of a plurality of sensor regions receiving useful drive signals at a time, wherein only if a finger is in the region receiving the useful drive signals will the touch sensor receive useful information; and 4) creating the desired useful electrical fields in the one region out of four regions, while creating cancelling electrical fields in the other regions.

\* \* \* \* \*